United States Patent
Fougner et al.

(10) Patent No.: US 12,357,998 B2
(45) Date of Patent: Jul. 15, 2025

(54) APPARATUS AND METHOD FOR GRINDING PARTICULATE MATERIAL

(71) Applicant: Fidetechnology LDA, Madeira (PT)

(72) Inventors: Anders Fougner, Værløse (DK); Mads Jespersen, Sandy, UT (US)

(73) Assignee: FIDETECHNOLOGY LDA, Madeira (PT)

( * ) Notice: Subject to any disclaimer, the term of this patent is extended or adjusted under 35 U.S.C. 154(b) by 193 days.

(21) Appl. No.: 17/997,068

(22) PCT Filed: Apr. 29, 2021

(86) PCT No.: PCT/IB2021/053599
§ 371 (c)(1),
(2) Date: Oct. 25, 2022

(87) PCT Pub. No.: WO2021/220227
PCT Pub. Date: Nov. 4, 2021

(65) Prior Publication Data
US 2023/0166266 A1    Jun. 1, 2023

(30) Foreign Application Priority Data

Apr. 29, 2020 (PT) .......................................... 116315
Apr. 29, 2020 (PT) .......................................... 116316
Jul. 29, 2020 (EP) .................................... 20188485

(51) Int. Cl.
*B02C 4/28* (2006.01)
*B02C 15/00* (2006.01)
(Continued)

(52) U.S. Cl.
CPC ............ *B02C 4/286* (2013.01); *B02C 15/007* (2013.01); *B65G 15/14* (2013.01); *B65G 33/18* (2013.01)

(58) Field of Classification Search
CPC ....... B02C 4/286; B02C 15/007; B02C 15/00; B65G 15/14; B65G 33/18
See application file for complete search history.

(56) References Cited

U.S. PATENT DOCUMENTS

2004/0140177 A1    7/2004  Loesche
2013/0313348 A1   11/2013  Keyssner
(Continued)

FOREIGN PATENT DOCUMENTS

| DE | 19651103 A1 | 6/1998 |
| EP | 0112022 A2 | 6/1984 |
| WO | 2013143565 A1 | 10/2013 |

OTHER PUBLICATIONS

International Search Report for corresponding PCT Application No. PCT/IB2021/053599.

*Primary Examiner* — Mohammed S. Alawadi
(74) *Attorney, Agent, or Firm* — Leason Ellis LLP (57) ABSTRACT

A vertical roller mill comprising a grinding table and a grinding roller having a rotational axis, each having a grinding surface and arranged to define a grinding zone between the grinding surfaces grinds particulate material. A feeder feeds the particulate material to the vertical roller mill, with the grinding roller arranged to roll around a grinding path on said grinding table. The feeder receives a supply of the particulate material and directs that material to flow to the grinding zone of the vertical roller mill. The feeder can constrain the flow of material to a defined cross-section by applying a momentum to and/or pushing, or to compact the flow of material prior to directing the material, or combinations thereof. In particular, the disclosure is applicable to grinding particulate materials like mining ores, industrial minerals and chemicals, sand, slag, ash, clay, pigments for coatings, pharmaceuticals and cement raw materials.

20 Claims, 7 Drawing Sheets

(51) Int. Cl.
*B02C 23/02* (2006.01)
*B02C 23/24* (2006.01)
*B02C 23/26* (2006.01)
*B65G 15/14* (2006.01)
*B65G 33/18* (2006.01)

(56) References Cited

U.S. PATENT DOCUMENTS

2015/0034746 A1* 2/2015 Storm .................. B02C 15/003
 241/47
2017/0333910 A1* 11/2017 Jensen ..................... B02C 4/30

* cited by examiner

APPARATUS AND METHOD FOR GRINDING PARTICULATE MATERIAL

CROSS-REFERENCE TO RELATED APPLICATIONS

This application is a U.S. National Phase Application under 35 U.S.C. § 371 of International Application No. PCT/IB2021/053599, filed Apr. 29, 2021, which claims priority to Portugal Patent Application No. 116315, filed Apr. 29, 2020, Portugal Patent Application No. 116316, filed Apr. 29, 2020 and EP patent application No. 20188485.5, filed Jul. 29, 2020, the contents of which are hereby incorporated by reference in their respective entireties.

TECHNICAL FIELD

The present disclosure relates to a vertical roller mill apparatus and respective operation method for grinding particulate material, in particular, but not necessarily, mining ores, industrial minerals and chemicals, sand, slag, ash, clay, pigments for coatings, pharmaceuticals, cement production and cement raw materials.

BACKGROUND

Vertical roller mill apparatuses are used for grinding different kinds of particulate materials such as e.g. mining ores, industrial minerals and chemicals, sand, slag, ash, clay, pigments for coatings, pharmaceuticals, limestone, cement clinker, slag sand, old concrete and additionally materials of the minerals, mining and other industries. These materials can also be designated as granular materials, pulverulent materials, or particulate materials; in general, brittle materials, including all kinds of granular or particulate materials used in industrial and chemical production or in the chemical or pharmaceutical industry, in particular cement production or cement raw materials.

Traditional vertical roller mill apparatuses suffer from a number of limitations.

One limitation of the known traditional vertical mill apparatuses is that the material in the grinding zone only can be enclosed by two surfaces, the grinding surfaces, leaving the sides of the grinding zone open thus allowing material to escape from the pressure in the grinding zone. This severely limits the effective grinding width to a small fraction of the grinding surface width resulting in excessively wide, heavy and expensive grinding rollers and tables with poor efficiency.

Further in a traditional vertical roller mill the particulate material is added to the middle of the grinding table and transported or flowing across the table to the grinding surface and into the grinding zones assisted by the rotation of the table. At a certain rotational speed, the majority of the material leaves the table without passing through the grinding zones under the rollers due to the centrifugal force created by the rotation of the grinding table. This limits the operational speed and thus the grinding capacity of the vertical roller mill.

With increasing speeds and fineness, the grinding bed typically becomes less stable due to a number of factors one thought to be air entrapped in the material and another irregular supply of material to the grinding zone. The instability limits the fineness that can be economically achieved in a traditional vertical roller mill.

The addition of water to the material can to some extend alleviate the grinding bed instability. However, the addition of water is undesirable for many materials, for example cement, as it affects the product quality. Further the addition of water adds to the operating costs.

In traditional vertical roller mills instability of the grinding bed is a cause of heavy and potentially damaging vibrations of the rollers. As mills are usually operated close to the limiting speed in order to maximise capacity, vibrations are a frequent occurrence and in many plants a problem.

For example, document EP0112022A2 discloses a vertical roller mill with a grinding table, rollers and a separator for separating ground material.

As another example, document WO2013/143565A1 discloses a vertical roller mill which is suitable for the cement industry and the grinding of moist cement raw materials and includes a predrying device for predrying the moist material.

These facts are disclosed in order to illustrate the technical problem addressed by the present disclosure.

GENERAL DESCRIPTION

The present disclosure relates to a vertical roller mill apparatus for grinding particulate material and respective method. An aspect of the present disclosure comprises:
  a vertical roller mill for grinding the particulate material, comprising a grinding table having an axis and, one or more, grinding rollers each having a rotation axis and being arranged to define grinding zones between said grinding table and each of the said rollers, and a feeder, comprising conveying means, whether single or an array of devices united, for each roller, preferably a mechanical conveying means, for conveying particulate material to the vertical roller mill and having a proximal end and a distal end relative to the vertical roller mill, the vertical roller mill being arranged at the proximal end of the conveying means.

Included in the objectives of the present disclosure is to eliminate at least some of the limitations of known vertical roller mill apparatuses for grinding particulate material, to provide a cost effective solution yielding an increased throughput and capacity, reduce the need to add water for grinding bed stabilisation, to permit finer grinding than economically possible with known vertical roller mills and to reduce vibrations.

It is disclosed an apparatus for grinding particulate material, in particular for cement production, comprising:
  a vertical roller mill for grinding the particulate material and comprising a grinding table and a grinding roller having a rotational axis, each table and roller having a grinding surface and being arranged to define a grinding zone between the grinding surfaces of the grinding roller and of the grinding table; and
  a feeder for feeding the particulate material to the vertical roller mill;
  wherein the grinding roller is arranged to roll on the particulate material on a grinding path on said grinding table; and the feeder is arranged to receive a supply of the particulate material and to direct a flow of that material to the grinding zone of the vertical roller mill, in particular at a velocity in relation to the grinding roller axis of at least 0.3 times the tangential velocity of the grinding roller grinding surface or at least 0.6, 0.7, 0.8, 0.9, 1.0, 1.1, 1.2, 1.3, 1.4, 1.5, 1.6, 1.7, 2.0, 3.0 or 4.0 times the tangential velocity of the grinding roller grinding surface.

The apparatus for grinding particulate material may be a mining ore grinding machine or mill; an industrial grinder;

a mineral grinder or mill; a chemical material grinder; a sand, slag, ash or clay grinding machine; a pigment grinding machine; a grinding machine for use in the production of coatings, pharmaceuticals or cement.

The feeder may be arranged to substantially constrain the flow of material being directed to the grinding zone to a predetermined defined cross-section.

The feeder may be arranged to direct the flow of material by applying a momentum to, or pushing, or applying a momentum to and pushing, the material into the grinding zone.

The feeder may be arranged to compact the flow of material prior to directing the material into the grinding zone.

The feeder may be arranged to direct the flow of material to the grinding zone at an angle substantially tangentially to the grinding path.

The feeder may be arranged to direct the flow of material into the grinding zone at substantially the same velocity as the tangential velocity of the grinding roller at the grinding zone.

The feeder may comprise a guiding tray that is adjacent and substantially parallel to the material flow, or adjacent and tangential to the material flow, in particular the guiding tray being a curved tray.

The feeder may be arranged to direct the flow of material into the grinding zone at an angle relative to a plane defined by the grinding table grinding surface, wherein the angle is more than zero and less or equal than 30°, in particular more than zero and less or equal than 15°, further in particular more than zero and less or equal than 10°, in particular more than zero and less or equal than 5°.

The apparatus may comprise:
one or more additional grinding rollers; each having a rotational axis and a grinding surface, and being arranged to define a respective grinding zone between the grinding surface of the grinding roller and of the grinding table;
wherein the one or more additional grinding rollers are arranged to roll on the particulate material on one or more additional grinding paths on said grinding table.

The apparatus may comprise:
one or more additional feeders for feeding the particulate material to the vertical roller mill;
wherein the one or more additional feeders are each arranged to receive a supply of the particulate material and to direct a flow of that material to the respective grinding zone of one grinding roller.

The feeder may comprise at least one belt conveyor comprising at least two pulleys and one belt extending around said pulleys.

The feeder may comprise two runs of belt arranged opposite each other in respect of the particulate material to constrain the particulate material between the two runs of belt.

The two opposite runs of belt may form a funnel with an opening for receiving the particulate material, the funnel having an opening angle of at least 0.5, 1, 5, 10, 15, 20, 25, 30, 40, 50, 60 or 70 degrees between the runs of belt forming the funnel.

The feeder may comprise at least one deflection drum deflecting a first run of belt towards a second run between two pulleys to impart the first run a curved shape.

The deflection drum may comprise a plurality of holes in the peripheral surface, in particular the holes being blind holes.

The deflection drum may comprise a plurality of spaced wheels engaging the belt.

The deflection drum may comprise a plurality of projections.

The feeder may comprise at least one screw conveyor comprising a rotating helical screw blade.

The feeder may comprise at least one stationary gravity feeder such as a pipe, a chute or a plate.

The feeder may comprise an array of sub-feeders united and arranged to form a combined flow of material and to direct the flow to the grinding zone of the vertical roller mill.

The grinding table and grinding rollers of the vertical roller mill may be driven by independent motors.

The one or more of the feeders, grinding rollers or grinding table may comprise independent drive mechanisms that are operable independently of the others including the feeder or feeders being operable independently of the vertical roller mill table or the vertical mill roller or rollers being operable independently of the vertical mill table; or the feeder or feeders, the mill table, and the roller or rollers being independently operable.

The grinding table and grinding rollers of the vertical roller mill may during operation be fixed relative to each other except for rotation at a predetermined adjustable distance thereby creating a fixed grinding zone.

The apparatus may be configured to be operable at a speed giving the grinding roller grinding surface a tangential velocity of at least 2 m/s or at least 4, 6, 8, 10, 12, 14, 16, 19, 22, or 25 m/s.

The vertical roller mill may comprise an inner grinding zone support device extending axially away from the grinding table, beyond the grinding table grinding surface, being substantially concentric with the grinding table rotational axis and having an outer diameter equal to 0.8 to 1.0 times the inside diameter of the grinding table grinding surface.

The vertical roller mill may comprise at least one outer grinding zone support device radially extending beyond the grinding roller grinding surface, having a surface facing the grinding table and said surface being axially located at a distance from the grinding table rotational axis of 1.0 to 1.1 times the grinding table grinding surface' outer radius measured in a plane coincident with the grinding table grinding surface and perpendicular to the grinding table rotational axis such that the surface of the outer grinding zone support device facing the grinding table provide side support for the material flow in the grinding zone and thus reduce the side spillage of material.

It is also disclosed a method for grinding particulate material, in particular a method of operating any of the disclosed apparatus, comprising the steps of:
receiving a supply of particulate material;
forming a flow of the particulate material;
using a feeder to direct the particulate material flow to a grinding zone of a vertical roller mill comprising a grinding table and a grinding roller having a rotational axis, each table and roller having a grinding surface and being arranged to define said grinding zone between the grinding surfaces of the grinding roller and of the grinding table, the grinding roller being arranged to roll on the particulate material on a grinding path on said grinding table, in particular at a velocity in relation to the grinding roller axis of at least 0.3 times the tangential velocity of the grinding roller grinding surface or at least 0.6, 0.7, 0.8, 0.9, 1.0, 1.1, 1.2, 1.3, 1.4, 1.5, 1.6, 1.7, 2.0, 3.0 or 4.0 times the tangential velocity of the grinding roller grinding surface; and
grinding the particulate material in the vertical roller mill.

The particulate material may be directed to the grinding zone of the vertical roller mill in a substantially straight direction, that is without substantial directional change between the feeder and the grinding zone other than that caused by gravity.

The method may comprise compacting the flow of material by imposing a directional change by application of a centrifugal force.

The particulate material may be directed to the grinding zone at a velocity in relation to the roller axis of at least 0.6 times the tangential velocity of the grinding roller grinding surface or at least 0.7, 0.8, 0.9, 1.0, 1.1, 1.2, 1.3, 1.4, 1.5, 1.6, 1.7 or 2.0 times the tangential velocity of the grinding roller grinding surface in relation to the grinding table.

The method may comprise providing an air flow substantially parallel to and in contact with the flow of the material being transferred and characterized by the airflow having a velocity between 0.5-3 times the velocity of the flow of particulate material, such as at least 0.5 times the velocity of the material or at least 0.6, 0.8, 1.0, 1.2, 1.4 or 2.0 times the velocity of the material.

Forming a flow of particulate material may comprise combining several flows of material to provide one common flow of material.

The method may comprise supporting the particulate material in the grinding zone at least on one side of the grinding zone for reducing the escape of particulate material from the volume between the grinding surfaces.

BRIEF DESCRIPTION OF THE DRAWINGS

The following figures provide preferred embodiments for illustrating the disclosure and should not be seen as limiting the scope of disclosure. The FIGS. 2A-2N show some ways of implementing what is to be understood as a vertical roller mill in the context of this disclosure. The FIGS. 3-15 each show a way of implementing the present disclosure or a specific part thereof.

DETAILED DESCRIPTION

The objective of the present disclosure is to eliminate at least some of the limitations of known vertical roller mill apparatuses for grinding particulate material, to provide a cost effective solution yielding an increased throughput and capacity, reduce the need to add water for grinding bed stabilisation, to permit finer grinding than economically possible with known vertical roller mills and to reduce vibrations.

Figure 1A:
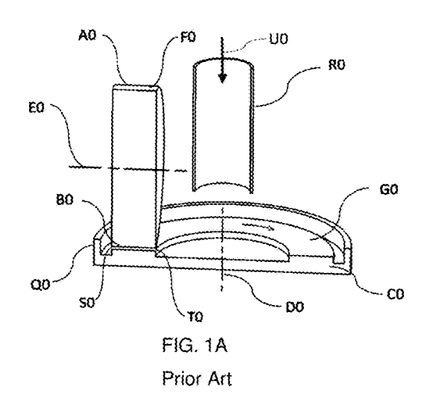
FIG. 1A is a cross sectional representation an already known vertical roller mill.

FIG. 1A depicts a traditional vertical roller mill comprising a grinding table C0 and one or more grinding rollers A0 (only one shown) rotating about axes D0 and E0 respectively and forming a grinding zone B0 between the respective grinding surfaces F0, G0. The grinding rollers are movable towards and away from the grinding table and the grinding pressure in the grinding zone is regulated by a applying a force to the grinding roller and allowing the roller to move according to the amount of feed to the grinding zone.

The traditional vertical roller mill further comprises a circumferential dam ring Q0. The height of the dam ring Q0 regulates the level of the material that enters the grinding zone B0 and for practical purposes operation without a dam ring is not possible. After passing the grinding zone the material flows over the dam ring and is carried away. Likewise, excess feed material in front of the grinding zone flows over the dam ring and is carried away.

The material feed U0 is supplied centrally to the grinding table C0 through the pipe R0 and flows across the grinding table, assisted by the rotation of the table, on to the grinding surface and into the grinding zone under the grinding roller.

Figure 1B:
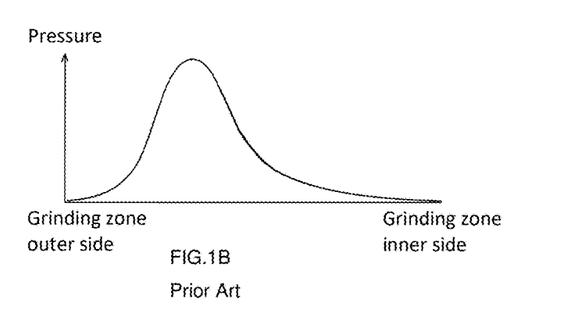
FIG. 1B Shows the pressure profile in the grinding zone of known vertical roller mills.

The sides S0, T0 of the grinding zone B0 are open and therefore material can escape to the sides from the grinding zone B0. The result of material escaping from the grinding zone is that sufficient pressure to cause grinding of the particulate material only exists in a limited part of the grinding zone width. A typical radial pressure profile across the grinding zone is shown in FIG. 1B. The pressure profile shows a high-pressure peak of limited width. The grinding takes place in the area of the high-pressure peak.

Due to the curvature of the grinding table C0 and potential interference with the grinding roller A0 it is not possible to bring the rotating dam ring Q0 closer to the grinding zone B0 in order to provide side support and prevent material escaping through the outside S0 of the grinding zone. Likewise, it is not operationally feasible to add a rotating supporting surface at the inside T0 of the grinding zone, as this necessarily must extend above the grinding table grinding surface G0 and thereby interferes with and limits the material flow to the grinding zone.

Attempts have been made to use stationary material guides at the inside of the grinding surfaces and stationary dam devices close to the grinding zone, including some that do not extend all the way around the grinding table. However, experiments have shown that such arrangements lead to increased wear and higher energy consumption. Therefore, they do not have commercial value.

The disclosure described herein overcomes these limitations by providing a constant regulated flow of material of suitable cross section directed to (and at) the grinding zone and in particular with a positive momentum in the direction of the grinding process whereby the material is effectively forced into the grinding zone and creates a stable grinding bed.

The directed delivery of the material to the grinding zone eliminates or reduces substantially the influence of the grinding table centrifugal force, it eliminates the need to add water for stability, eliminates the need for a dam ring and the material does not flow across the grinding table. Thus, it is possible to implement rotating devices to support the sides of the material in the grinding zone.

Further, the supply of a constant regulated flow of material allows both the grinding table and the grinding rollers to be, with exception of the rotation, fixed relative to each other while maintaining a grinding pressure. The fixed geometry of the grinding zone greatly reduces vibrations compared to the familiar arrangement with a fixed grinding table and movable rollers.

Figure 1C:
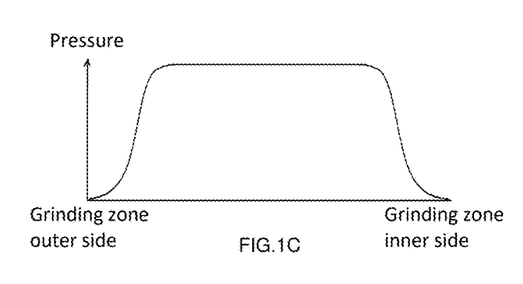
FIG. 1C Shows the pressure profile in the grinding zone vertical roller mills in an apparatus according to the disclosure.
Figure 13A:
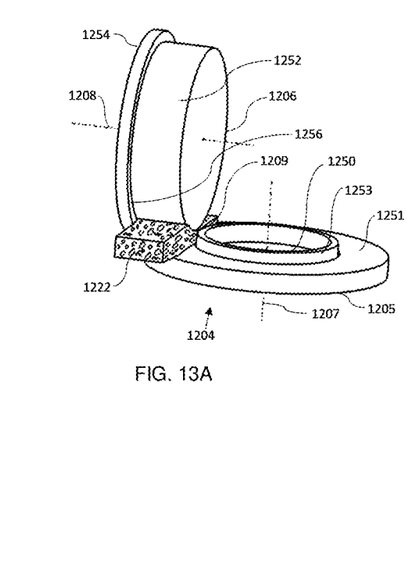
FIG. 13A is a diagrammatical representation an embodiment of a vertical roller mill in which inner and outer grinding zone support devices provide support to the sides of the material in the grinding zone.
Figure 13B:
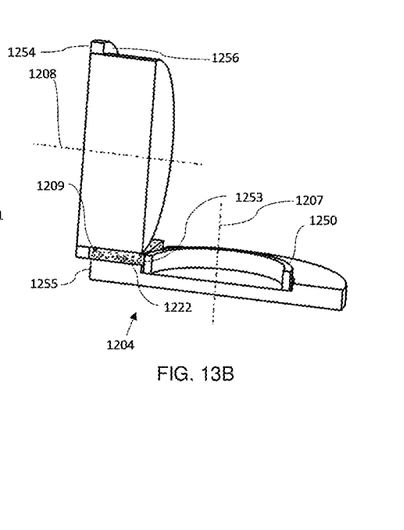
FIG. 13B is a cross sectional view of the vertical roller mill depicted in FIG. 13A.

Enclosing or supporting the sides of the grinding zone leads to a radial pressure profile across the grinding zone as shown in FIG. 1C. The width of the high pressure is greatly increased compared to the traditional arrangement and grinding can occur over a much greater part of the grinding surface thereby increasing grinding capacity. One embodiment of the vertical roller mill in an apparatus according to the disclosure in which the sides of the grinding zone are enclosed or supported is shown in FIG. 13A and FIG. 13B.

Figure 2A:
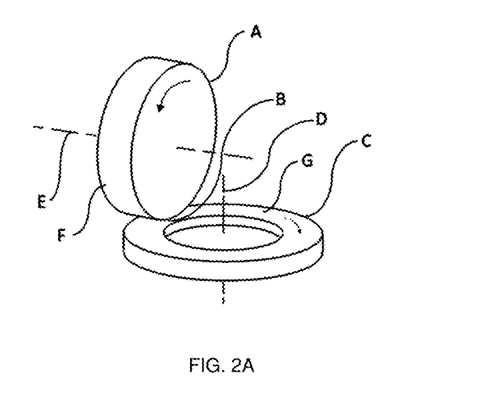
FIG. 2A is a diagrammatical representation of an embodiment of a vertical roller.

By the term "vertical roller mill" is to be understood a grinding device comprising a grinding table having an axis and at least one grinding roller having a rotation axis, said grinding table axis being perpendicular to a plane defined by the grinding table and passing through the geometric centre of the grinding path, and being arranged to define grinding zones between the grinding surface of the grinding table and the grinding surface of each of the rollers. The grinding roller/s are arranged to roll around the grinding path on the grinding table. The grinding table may or may not be rotating about its axis. The grinding table may be arranged below, beside or above the roller/s with the axis vertical, or with the axis at any angle between vertical and horizontal in any direction. The grinding zone/s are formed between the grinding surfaces of the roller/s and the grinding surface of the grinding table and may in cross section be substantially rectangular or any other shape, with linear or curved edges, or any combination thereof. FIGS. 2A-2N depicts some variations of what is to be understood as a vertical roller mill but shall not be construed to exclude other vertical roller mill arrangements.

By the term "grinding zone" is to be understood the volume between a grinding roller and the grinding table grinding surfaces in which the particulate material is gripped, compressed and/or crushed by the grinding roller and the grinding table. Delivery or directing of material to the grinding zone is in the context of this disclosure to be understood to include arrangements where the material is transferred directly onto one of the grinding surfaces before gripping can occur and thereafter follow said surface to and through the grinding zone.

By the term "feeder" is to be understood a device which accelerates and/or conveys the particulate material. Feeders include, belt conveyors, chain conveyors, belt throwers, screw conveyors, vibratory conveyors, pipes, chutes and more.

By the term "constrained flow of material" is to be understood that the flow of material has a predetermined defined cross section without being necessarily physically constrained by physical means. The flow can be constrained due to the way it is projected from the feeder or by means of physical means or by a combination of the two. When constrained to a defined cross-section, the directed flow of material can take the form of a mat, in particular a mat having a rectangular cross-section.

By the term "to compact a flow of material" is to be understood that the material supplied to the feeder, during contact with the feeder undergoes a change in cross sectional shape, cross sectional size and/or experiences a change in bulk density due to a change in the volume of voids within the material flow and/or the material combines with another material flow to form one common combined flow.

By the term "array of devices united" is to be understood any number of conveying means, similar or of different types that are operating simultaneously to transfer material to a single grinding zone. The individual conveying means may be supplied with material from the same source or from individual sources and may be operated individually, at different speeds and/or feed rates. Further the conveying means can share common parts e.g. a common housing, enclosure or common guide plate.

The apparatus according to the disclosure is characterized in that the feeder is arranged and configured to receive a supply of particulate material and form, and preferably constrain, a flow of the material and to direct the flow of particulate material to a grinding zone of the vertical roller mill. The flow is delivered directly by the feeder to the grinding zone under acceleration, compaction, and/or cross-sectional constraining.

An aspect of the disclosure relates to the feeder being arranged to constrain the flow of material to a defined cross-section, this cross-section being defined for the flow of material between the feeder and the grinding zone.

An aspect of the disclosure relates to the feeder being arranged to direct the flow of material by pushing a compacted flow of material into the grinding zone.

An aspect of the disclosure relates to the feeder being arranged to direct the flow of material by applying a momentum to the material into the grinding zone.

In an embodiment of the disclosure, the flow of material is directed to the grinding zone at an angle that is substantially tangential to the grinding path. In this way, the efficiency and stability, and thus speed, of grinding can be improved.

An inlet device configured to deliver the particulate material to the feeder can be included in the apparatus. The inlet device can preferably be arranged at the distal end of the feeder.

In one embodiment of an apparatus according to the disclosure, the feeder comprises a belt conveyor. The belt is an endless belt running around two mutually spaced conveyor pulleys, one of the pulleys being a drive pulley. The drive pulley is preferably arranged at the distal end of the feeder. The feeder can comprise a single conveyor belt having a first run on which the particulate material is delivered from e.g. a feeding container to form a flow of material on the first run.

In a variation of the embodiment the feeder comprises two or more belt conveyors as described above and united in an array to form a flow of material and to transfer the flow to the grinding zone. The individual conveyors in the array may be operated at different speeds to provide optimal flow at the grinding zone.

In an additional embodiment of an apparatus according to the disclosure, the feeder comprises two oppositely and parallel arranged belt conveyors. The oppositely arranged belt conveyors physically constrain and accelerate the particulate material supplied to the space between them to the desired velocity.

In an additional embodiment of an apparatus according to the disclosure, the feeder comprises two belt conveyors arranged so there is an angle between two opposite runs of belt there by forming a funnel for gripping and accelerating the material. The angle between the runs of belt is more than zero and less than or equal to 90°, preferably less than or equal to 70°, in particular more than zero and less than 5 degrees, or less than 10, 15, 20, 25, 30, 40, 50, 60 or 70 degrees.

A funnel-like belt setup provides enhanced compression of the particulate material increasing the density and compactness of the material being fed, wedging the material between the belts, such that the material will not slip against the belt surfaces as it is being fed into the grinding surface.

The angle will normally depend on the friction between belts and material. A lower friction coefficient will normally require a lower funnel opening angle such that the material does not slip in respect of the belts. Conversely, a higher friction coefficient will normally enable a higher funnel opening angle such that the material can acquire compaction over a shorter distance.

According to a further embodiment of an apparatus according to the disclosure, the feeder comprising conveyor belt can further comprise a conveying guide plate arranged opposite and parallel with a run of the belt conveyor facing the guide plate and carrying the particulate material.

According to a further embodiment of an apparatus according to the disclosure, the feeder comprises a screw conveyor. The screw conveyor comprises spindle with a helical screw blade in a housing with an inlet end and an outlet end. Material supplied to the screw conveyor at the inlet end is accelerated and/or conveyed by rotation of the spindle and is projected from the screw conveyor outlet end to the grinding zone of the vertical roller mill. The outlet of the screw conveyor housing may be shaped to constrain the flow of material to a particular cross-sectional shape that is transferred to the grinding zone, e.g. rectangular, thus forming a mat of material to be fed to the grinding zone.

According to a variation of the previous embodiment of an apparatus according to the disclosure, the feeder comprises an array of several screw conveyors united. The array may comprise screw conveyors with individual housings or it may comprise an array of spindles with helical screw blades in a common housing.

In an additional embodiment of an apparatus according to the disclosure, the feeder comprises a stationary device e.g. a pipe, a chute or a plate, with a stationary concave surface. The material is supplied at high velocity to the stationary device and flows over the concave surface. As the material flows along the concave surface the material is compacted and constrained due to the centrifugal force applied by the directional change. The flow leaves the curve being directed to a grinding zone of the vertical roller mill.

According to an additional embodiment of an apparatus according to the disclosure, the feeder comprises a belt conveyor in combination with a deflection drum deflecting a first run of the belt towards a second run between the two conveyor pulleys to impart the first run a curved shape. Particulate material is supplied to the distal end of the belt or to the deflection drum and enclosed in the space between the deflection drum and the first run of the belt. During the motion through the curvature of the belt the particulate material is accelerated to the speed of the belt and forms a flow of material that is directed to the grinding zone of the vertical roller mill.

In a variation of this embodiment the deflection drum can comprise two or more mutually spaced wheels engaging the first run of the belt.

In a further variation of this embodiment the deflection drum can comprise a plurality of holes in the peripheral surface. The holes may be blind holes. The holes may be rectangular in cross section or any other shape.

In an additional variation of this embodiment the deflection drum can comprise a plurality of projections engaging with the particulate material and/or at least substantially engaging with the surface of the belt. The projections may be at least the width of the material flow, or they may less than the width of the material flow and/or arranged in a staggered pattern. Further the projections may be perpendicular to the plane of rotation of the deflection drum or they may be at any angle to this plane.

According to an additional embodiment of an apparatus according to the disclosure, the feeder comprises a chain conveyor comprising at least one endless chain with cross bars for engaging and conveying the particulate material, running around two mutually spaced chain sprockets. The feeder can further comprise a guiding tray adjacent to and parallel with the run of the chain that is conveying the material.

According to the embodiments of an apparatus according to the present disclosure, the vertical roller mill can further be provided with an inner grinding zone support device. The inner grinding zone support device extends along the grinding table axis away from the grinding table and beyond the grinding table grinding surface. The device is substantially concentric with the grinding table axis and having an outer diameter equal to 0.8 to 1.0 times the inside diameter of the grinding table grinding surface such that the circumferential surface of the inner grinding zone support device supports the material flow in the grinding zone to reduce side spillage. Preferably the outer diameter of the device is 1.0 times the inside diameter of the grinding surface radius less 1 to 20 mm. The inner grinding zone support device can be part of the grinding table or a separate part. Preferably, the device is stationary with reference to the grinding table. The outer circumferential surface supporting the material in the grinding zone may be cylindrical, conical, otherwise curved or any combination thereof.

Further the embodiments of an apparatus according to the present disclosure, the vertical roller mill can be provided with at least one outer grinding zone support device radially extending beyond the grinding roller/s grinding surface/s, having a surface/s facing the grinding table and said surface being axially located at a distance from the grinding table axis of 1.0 to 1.1 times the grinding table grinding surface' outer radius measured in a plane coincident with the grinding table grinding surface and perpendicular to the grinding table axis such that the surface/s of the outer grinding zone support device facing the grinding table provides side support for the material flow in the grinding zone and thus reduces the side spillage of material. Preferably said surface is located at a distance from the grinding table axis in the said plane of 1.0 times the grinding table grinding surface' outer radius plus 1 to 20 mm.

The outer grinding zone support device/s can be part of the roller/s or a separate device/s. Preferably the device is rotating with the grinding roller. The surface/s supporting the material in the grinding zone/s may be flat, conical, otherwise curved or any combination thereof.

According to an additional embodiment of an apparatus according to the present disclosure, the rotational axis of the grinding table is arranged between vertical and 90° relative to vertical, in a plane substantially parallel with the grinding table axis and the direction of flow of material, such as between substantially vertical and 30° relative to vertical, or such as between substantially vertical and 15° relative to vertical. According to an alternative embodiment of an apparatus, the axis of the grinding table is arranged between substantially horizontal and 45° relative to horizontal, such as between substantially vertical and 30° relative to horizontal, or such as between substantially horizontal and 15° relative to horizontal.

According to a further embodiment of an apparatus according to the disclosure can, for each conveying means of the feeder, further comprise a guiding device directing the flow of material to the grinding zone and comprising a single proximal, preferably planar guide plate or two oppositely arranged proximal guide plates, preferably planar guide plates, said guide plate/plates being arranged between the proximal end of the conveying means and the grinding zone of the vertical roller mill. The two oppositely arranged proximal guide plates can be substantially parallel or converge in the direction from the conveying means towards the vertical roller mill.

In an additional embodiment of an apparatus according to the disclosure, the flow of material on/in the feeder and/or between the feeder and the vertical roller mill grinding zone is arranged such that it is in contact with an air flow, substantially parallel to the material flow, with a velocity in the range 0.5-3 times the velocity of the material flow, such as at least 0.5 times the velocity of the flow or at least 0.6, 0.8, 0.9, 1.0, 1.1, 1.3, 1.4 or 2.0 times the velocity of the flow. The velocity of the air flow prevents material friction with the air from diverting the outer material in the flow away from the direction towards the grinding zone, and thereby reduces dispersion of the material being transferred to the grinding zone. The air flow parallel to the material flow is achieved by guiding the air with a least one plate substantially parallel to the flow of particulate material. In an alternative variation of this embodiment, the airflow is achieved by an arrangement of at least one nozzle through which the air is projected along the surface of the flow of particulate material.

In an additional embodiment of an apparatus according to the disclosure, the grinding table of the vertical roller mill is fixed in space, except for the rotational movement, and the roller/s are movable towards and away from the grinding table such that the grinding zone/s are adjustable. It should however be noted that the rollers could be fixed and the grinding table movable, and further that both the grinding table and the rollers of the vertical roller mill can be fixed relative to each other during operation in a preferred arrangement to provide constant grinding zone/s. The vertical roller mill can be driven by motors on the grinding table, on the rollers or both.

In an embodiment of an apparatus according to the disclosure the grinding roller/s and the grinding table are driven individually and the speed of each can be adjusted independently to achieve the optimal conditions in the grinding zone/s.

In an embodiment of an apparatus according to the disclosure the feeder is operable at a speed providing the flow of particulate material with a speed of at least 2 m/s or at least 4, 6, 8, 10, 12, 14, 16, 19, 22, or 25 m/s at the grinding zone.

In an embodiment of the apparatus according to the disclosure, the particulate material is selected from mining ores, industrial minerals and chemicals, sand, slag, ash, clay, pigments for coatings, pharmaceuticals and cement raw materials.

The vertical roller mill of the apparatus according to the disclosure is preferably operable independent of the feeder, whereby it is possible to adapt to the operation of the feeder to the operation of the vertical roller mill and vice versa in order to obtain a smooth and reliable operation of the apparatus and thereby the desired throughput and capacity of the apparatus.

The apparatus according to the disclosure relates to a method for grinding particulate material comprising receiving a supply of particulate material, forming a flow, directing the particulate material to a grinding zone of a vertical roller mill and grinding the particulate material in the vertical roller mill.

The method can further comprise that the particulate material is directed from the feeder to grinding zone of the vertical roller mill without substantial directional change and/or that the particulate material is directed to the grinding zone at a velocity of at least 0.6 times the peripheral velocity of the grinding roller or at least 0.7, 0.8, 0.9, 1.0, 1.1, 1.2, 1.3, 1.4, 1.5, 1.6, 1.7 or 2.0 times the tangential velocity of the grinding roller grinding surface.

According to the disclosure, by feeding the flow of material at a substantially the same or similar velocity as the relative rotation between the grinding roller and the grinding table, the efficiency and stability, and thus speed, of grinding is improved.

The method can further comprise providing an air flow substantially parallel to and in contact with the flow of the material being transferred and characterized by the airflow having a velocity between 0.5-3.0 times the velocity of the flow of particulate material, such as at least 0.5 times the velocity of the material or at least 0.6, 0.8, 1.0, 1.2, 1.4 or 2.0 times the velocity of the material.

This section serves to explain the shown embodiments of what is to be understood as a vertical roller mill. It shall not be construed to exclude other embodiments of vertical roller mills.

FIG. 2A shows vertical roller mill comprising a grinding roller A, with a grinding surface F rotating about an axis E, and a grinding table C, with a grinding surface G rotating about an axis D, arranged to create a grinding zone B between the grinding surfaces F, G. In this embodiment the axes E, D of the grinding roller A and grinding table B are substantially perpendicular and the grinding roller substantially cylindrical in shape.

Figures 2B, 2C:
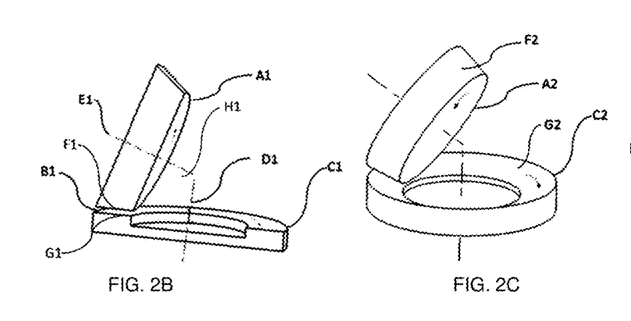
FIG. 2B is a cross sectional representation of a further embodiment of a vertical roller mill.
FIG. 2C is a diagrammatical representation of a further embodiment of a vertical roller mill.

FIG. 2B shows a cross section of a vertical roller mill comprising a grinding roller A1, with a grinding surface F1 rotating about an axis E1, and a grinding table C1 with a grinding surface G1 rotating about an axis D1, arranged to create a grinding zone B1 between the grinding surfaces F1, G1. In this embodiment the grinding surface F1 of the grinding roller A1 is substantially conical, whereas the grinding surface G1 of the grinding table C1 is substantially flat. The angle H1 between the rotational axes E1 and D1 is greater than 90 degrees. The grinding surfaces F1, G1 in the cross section of the grinding zone B1 are substantially parallel.

FIG. 2C shows a vertical roller mill comprising a grinding roller A2, and a grinding table C2. In this embodiment the grinding surface F2 of the grinding roller A2 is conical and the grinding surface G2 of the grinding table C2 is inwards conical.

Figure 2D:
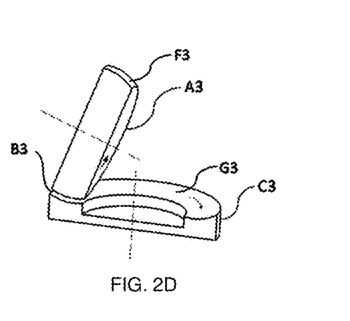
FIG. 2D is a cross sectional representation of a further embodiment of a vertical roller mill.

FIG. 2D shows a cross section of a vertical roller mill comprising a grinding roller A3 and a grinding table C3. In this embodiment the grinding surfaces F3, G3 of the grinding roller A3 and the grinding table C3 are curved in the cross section at the grinding zone B3.

Figure 2E:
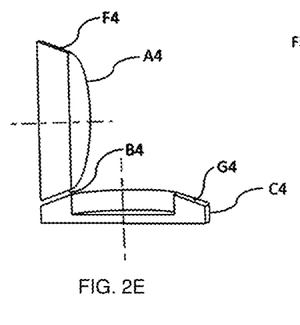
FIG. 2E is a cross sectional representation of a further embodiment of a vertical roller mill.

FIG. 2E shows a cross section of a vertical roller mill comprising a grinding roller A4 and a grinding table C4. In this embodiment the grinding surface F4 of the grinding roller A4 is conical and the grinding surface G4 of the grinding table C4 is conical outwards. The cross section of the grinding zone B4 shows the substantially straight outlines of the grinding surfaces F4, G4.

Figure 2F:
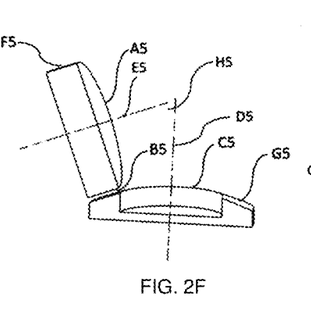
FIG. 2F is a cross sectional representation of a further embodiment of a vertical roller mill.

FIG. 2F shows a cross section of a vertical roller mill comprising a grinding roller A5 and a grinding table C5. In this embodiment the grinding surface F5 of the grinding roller A5 is cylindrical and the grinding surface G5 of the grinding table C5 is conical outwards. The outlines of the grinding surfaces F5, G5 are substantially straight in the cross section at the grinding zone B5. In this embodiment the angle H5 between the rotational axes D5, E5, of the grinding table C5 and grinding roller A5 respectively, is less than 90 degrees.

Figure 2G:
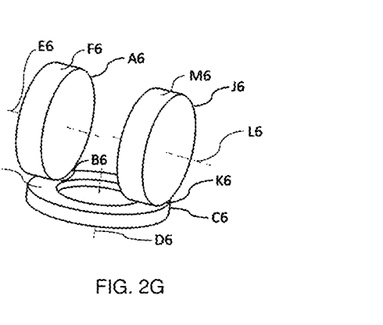
FIG. 2G is a diagrammatical representation of a further embodiment of a vertical roller mill.

FIG. 2G shows a vertical roller mill comprising two grinding rollers A6, J6, rotating about axes E6, L6, with a grinding surfaces F6, M6, and a grinding table C6 rotating about an axis D6, with a grinding surface G6, arranged to create grinding zones B6, K6 between the grinding surfaces F6, G6, and M6, G6.

Figure 2H:
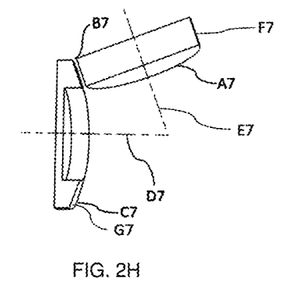
FIG. 2H is a cross sectional representation of a further embodiment of a vertical roller mill.

FIG. 2H shows a cross section of a vertical roller mill comprising a grinding roller A7 rotating about an axis E7, with a grinding surface F7, and a grinding table C7 is rotating about a horizontal axis D7, arranged to create a grinding zone B7 between the grinding surfaces F7, G7.

Figure 2I:
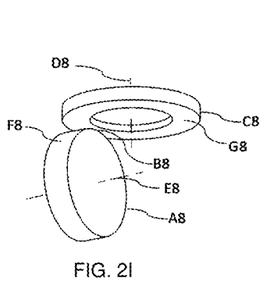
FIG. 2I is a diagrammatical representation of a further embodiment of a vertical roller mill.

FIG. 2I shows a vertical roller mill comprising a grinding roller A8 rotating about an axis E8 and a grinding table C8 rotating about a vertical axis D8 arranged to create a grinding zone B8 between the grinding surfaces F8, G8. In this embodiment the grinding table C8 is arranged above the grinding roller A8 such that the grinding surface G8 is on the underside of the grinding table C8.

Figure 2J:
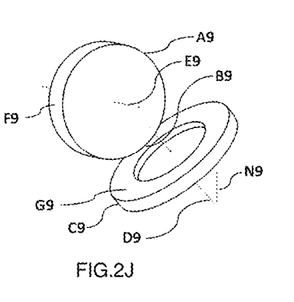
FIG. 2J is a diagrammatical representation of a further embodiment of a vertical roller mill.

FIG. 2J shows a vertical roller mill comprising a grinding roller A9 rotating about an axis E9 and a grinding table C9 rotating about an axis D9 arranged to create a grinding zone B9 between the grinding surfaces F9, G9. In this embodiment the rotational axis D9 of the grinding table C9 is inclined from a vertical axis N9 in a plane which is not parallel to the grinding roller axis E9.

Figure 2K:
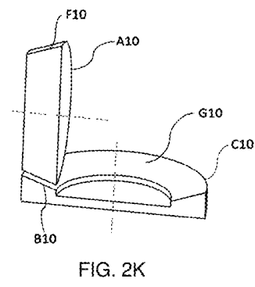
FIG. 2K is a cross sectional representation of a further embodiment of a vertical roller mill.

FIG. 2K shows a cross section of a vertical roller mill comprising a grinding roller A10 and a grinding table C10 arranged to create a grinding zone B10 between the grinding surfaces F10, G10. This embodiment differs from the one shown in FIG. 2E in that the grinding surface G10 on the grinding table C10 is conical inwards.

Figure 2L:
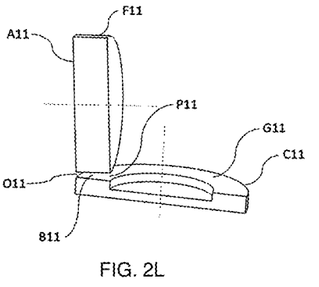
FIG. 2L is a cross sectional representation of a further embodiment of a vertical roller mill.

FIG. 2L shows a cross section of a vertical roller mill comprising a grinding roller A11, and a grinding table C11. This embodiment differs from the one shown in FIG. 2A in that the distance between the grinding surface G11 and the grinding surface F11 of the roller varies from across the width of the grinding zone B11 from the inner diameter to the outer diameter of the grinding surface G11. As shown, the distance P11 near the inner diameter of the grinding surface G11 is greater than the distance O11 near the outer diameter of the grinding surface G11 on the grinding table C11. The variation in distances between the grinding surfaces may be different in other vertical roller mill arrangements.

Figure 2M:
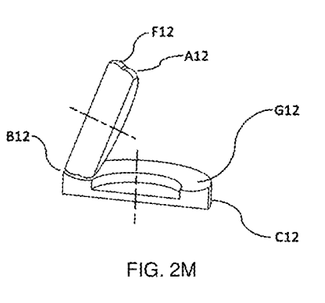
FIG. 2M is a cross sectional representation of a further embodiment of a vertical roller mill.
Figure 2N:
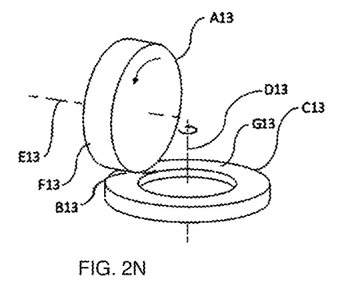
FIG. 2N is a diagrammatical representation of a further embodiment of a vertical roller mill.

FIG. 2M is a cross sectional representation a vertical roller mill comprising a grinding roller A12 and a grinding table C12 arranged to create a grinding zone B12 between the grinding surfaces F12, G12. In this embodiment the grinding roller grinding surface F12 is shaped to have multiple curves as seen in the cross section.

FIG. 2N shows vertical roller mill comprising a grinding roller A13, with a grinding surface F13 rotating about axes D13 and E13, and a stationary grinding table C13, with a grinding surface G13 arranged to create a grinding zone B13 between the grinding surfaces F13, G13.

Figure 3A:
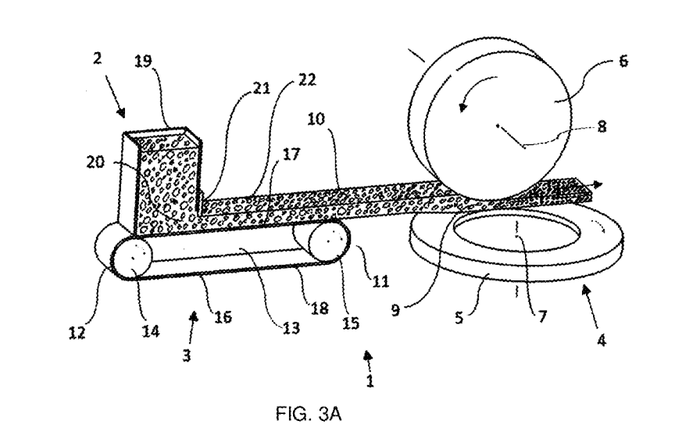
FIG. 3A is a diagrammatical representation and partly sectional view of a first embodiment of an apparatus according to the disclosure in which the feeder comprises a single belt conveyor, and particulate material by means of the feeder is transferred through free air to the vertical roller mill.

As shown in FIG. 3A, the first embodiment of an apparatus 1 according to the present disclosure for grinding particulate materials comprises an inlet device 2, a feeder 3 and a vertical roller mill 4. The vertical roller mill 4 for grinding particulate material supplied thereto comprises a grinding table 5 and one grinding roller 6, each having a rotational axis 7, 8 which are not parallel and being arranged to define a grinding zone 9. The feeder 3 is arranged and configured for conveying particulate material 10 to the vertical roller mill 4 and has a proximal end 11 next to the vertical roller mill 4 and an opposite distal end 12. The feeder comprises a belt conveyor 13 comprising two spaced conveyor pulleys 14, 15 and an endless conveyor belt 16 extending around the two conveyor pulleys 14, 15. The belt has a first run 17 and a second run 18. The belt is supplied with particulate material 10 at its distal end 12 by the inlet device 2. The inlet device comprises a feeding container 19 with a lower outlet opening 20 feeding particulate material to the distal end of the belt conveyor 13 arranged below the outlet opening 20. The size of the outlet opening 20 and thereby the amount of material delivered to the first run 17 of the conveyor belt 13 is adjustable by means of an adjustment means such as e.g. a gate 21. The speed of the belt 16 and the supply of particulate material from the feeding container 19 through the lower outlet opening 20 thereof and onto to the first run 17 of the belt is synchronised in such a way that a flow 22 of the particulate material is formed on the first run 17 of the belt. By means of the belt conveyor 13, the flow 22 is directed to the grinding zone 9 of the vertical roller mill 4. From the proximal end 11 of the belt conveyor 13, the flow 22 is projected through the air into the grinding zone 9.

Figure 3B:
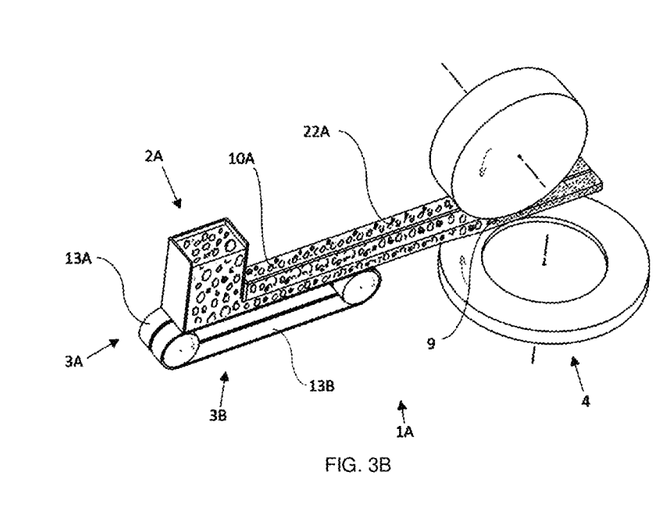
FIG. 3B is a diagrammatical representation and partly sectional view of a variation of the embodiment shown in FIG. 3A and differs therefrom in that the feeder comprises an array of two belt conveyors united to form the feeder.

A variation of the apparatus 1A according to the disclosure is shown in FIG. 3B where the feeder comprises an array of two united conveying means 3A, 3B. In this implementation the particulate material 10A is delivered to the conveyors 13A, 13B from a single inlet device 2A. The material may however also be delivered by individual inlet devices for each conveying means. The united conveying means 3A, 3B form a combined flow of material 22A which is delivered to the grinding zone 9 of the vertical roller mill 4.

Figure 4:
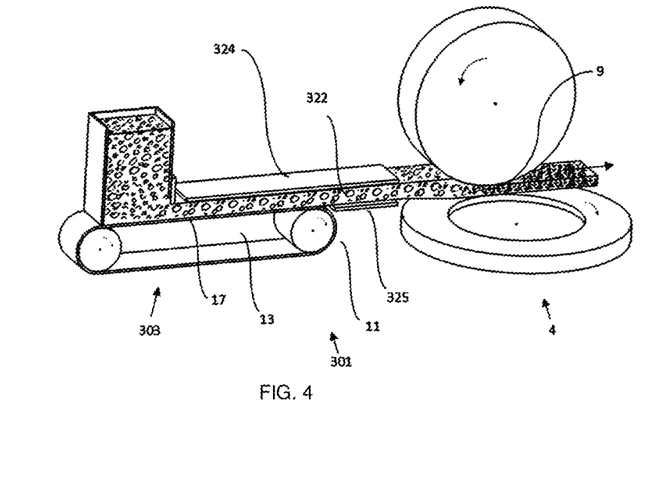
FIG. 4 is a diagrammatical representation and partly sectional view of a second embodiment of an apparatus according to the disclosure being a modification of the above first embodiment and in which the material on the first run of the belt conveyor is constrained by a conveying guide plate, and the particulate material is transferred to the vertical roller mill supported by a proximal lower guide plate.

The second embodiment of an apparatus 301 according to the disclosure shown in FIG. 4 is a modification of that shown in FIG. 3A and differs therefrom in that the feeder 303 thereof is provided with a conveyor guide plate 324 arranged opposite to the first run 17 of the belt conveyor 13. The conveyor guide plate constrains the flow 322 of particulate material together with the first run 17 of the belt conveyor 13. Additionally, the apparatus is provided with a lower proximal guide plate 325 arranged between the proximal end of the belt conveyor and the vertical roller mill 4 supporting the flow 322 during the transfer to the grinding zone 9 of the vertical roller mill 4. The proximal guide plate can be omitted provided that the particulate material is projected from the proximal end 11 of the belt conveyor with sufficient velocity to be transferred to the grinding zone 9.

Figure 5:
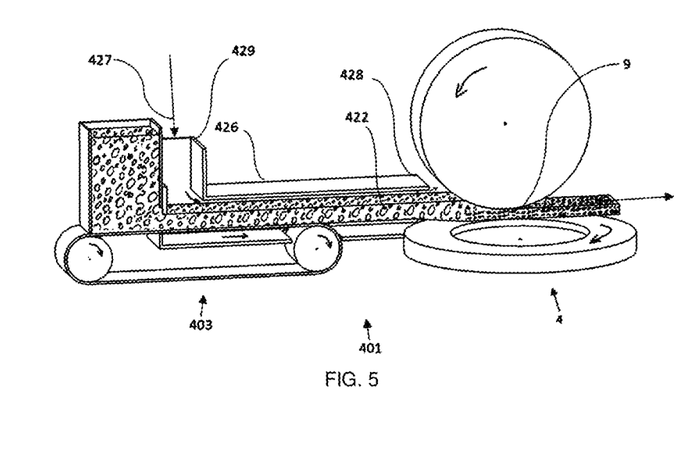
FIG. 5 is a diagrammatical representation and partly sectional view of a third embodiment of an apparatus according to the disclosure in which the feeder comprises a belt conveyor and an air guide through which an airflow is in contact with the flow of material during the transfer of the material to the vertical roller mill.

The third embodiment of an apparatus 401 according to the disclosure shown in FIG. 5 is a modification of that shown in FIG. 3A and differs there from in that the feeder 403 thereof is provided with an air swept guide 426 having a proximal end 428 and a distal end 429 and being arranged to direct an airflow 427 to be substantially parallel to and in contact with the flow 422 of particulate material being transferred from the feeder 403 to the grinding zone 9 of the vertical roller mill 4. The air flows through the guide 426 from the distal end 429 and exits at the proximal end 428 of the guide 426.

Figure 6:
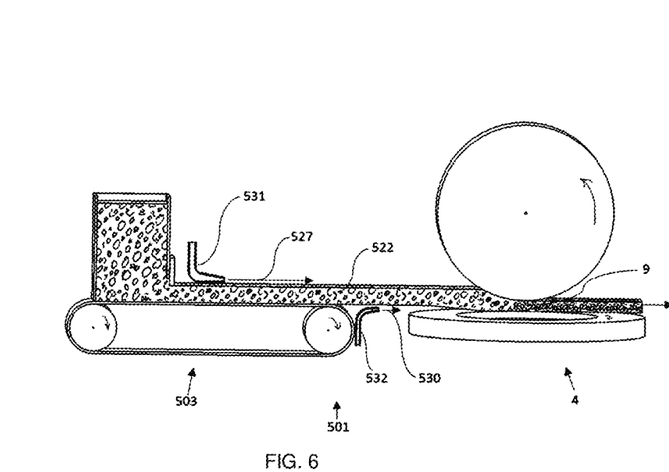
FIG. 6 is a diagrammatical representation and partly sectional view of a fourth embodiment of an apparatus according to the disclosure in which the transfer of the material from the feeder to the vertical roller mill is in contact with an air flow supplied by nozzles.

The fourth embodiment of an apparatus 501 according to the disclosure shown in FIG. 6 is a modification of that shown in FIG. 5 and differs there from in that the feeder 503 thereof is provided with an airflow 527 from a nozzle 531 and characterized by the air flow 527 being substantially parallel to and in contact with the flow 522 of particulate. Additionally, the arrangement is via an additional nozzle 532 provided with an air flow 530 below and in contact with the flow of particulate material 522 between the feeder 503 and the grinding zone 9 of the vertical roller mill 4. The air flows 527, 530 are both optional and can each be provided individually without the other.

Figure 7:
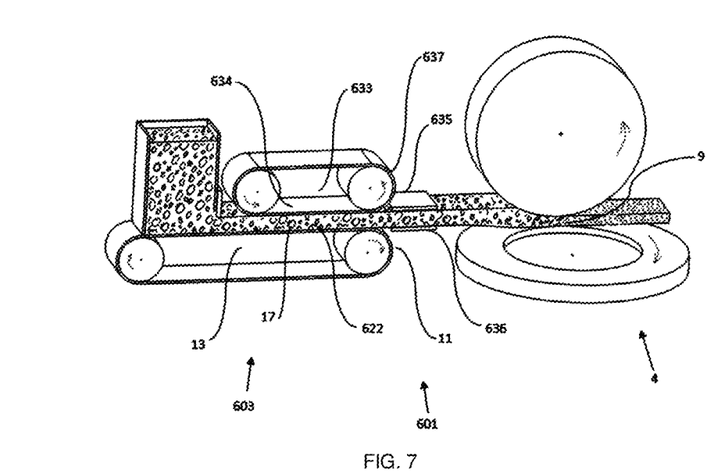
FIG. 7 is a diagrammatical representation and partly sectional view of a fifth embodiment of an apparatus according to the disclosure in which the feeder comprises two oppositely arranged belt conveyors.

The fifth embodiment of an apparatus 601 according to the disclosure shown in FIG. 7 is an alternative modification of the embodiment shown in FIG. 4. Instead of the conveyor guide plate, it comprises a second belt conveyor 633 arranged spaced from and parallel to the first belt conveyor 13. The first run 634 of the second belt conveyor 633 and the first run 17 of the first belt conveyor constrain the flow 622 of material. Further in FIG. 7 it is indicated that the apparatus shown can be provided with an upper proximal guide plate 635 and/or a lower proximal guide plate 636 arranged between the proximal ends 637, 11 of the conveyors 633,13 and guiding the flow during the transfer to the grinding zone 9 of the vertical roller mill 4.

Figure 8A:
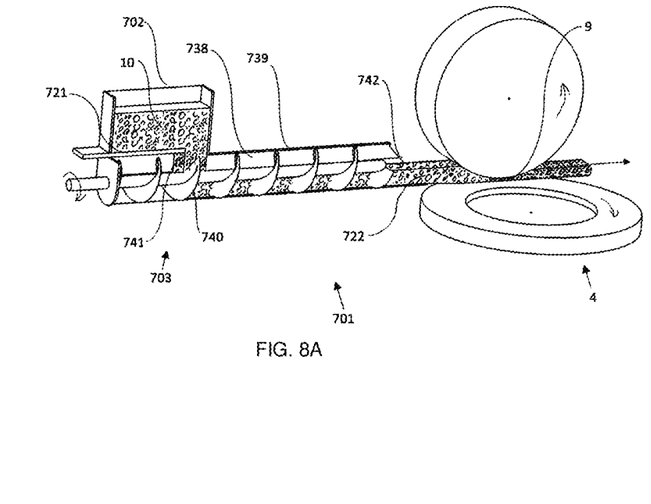
FIG. 8A is a diagrammatical representation and partly sectional view of a sixth embodiment of an apparatus according to the disclosure in which the feeder is a screw conveyor and the particulate material is transferred through free air to the vertical roller mill.

The sixth embodiment of an apparatus 701 according to the disclosure shown in FIG. 8A differs from the previous embodiments in that the feeder 703 comprises a screw conveyor 738. The screw conveyor 738 comprises a casing 739, with an inlet 741 and an outlet 742, and a helical screw blade 740 for conveying the particulate material 10. By turning the screw blade 740 the material 10 is moved from the inlet device 702 via the inlet 741 through the screw conveyor 738 and is projected from the outlet 742 as a flow 722 of material through the air to the grinding zone 9 of the vertical roller mill 4. The outlet 742 of the screw conveyor housing 739 may be shaped to constrain the flow 722 of material to a particular cross-sectional shape, e.g. rectangular. The amount of material delivered to the vertical roller mill 4 is regulated at the inlet device 702 by the use of a gate 721.

Figure 8B:
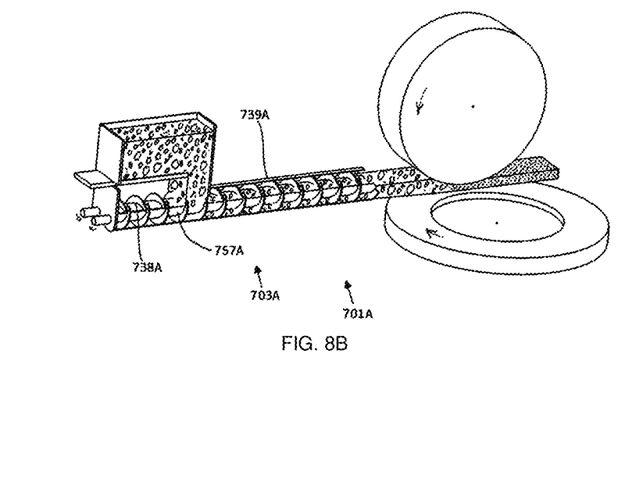
FIG. 8B is a diagrammatical representation and partly sectional view of a variation of the sixth embodiment of an apparatus according to the disclosure in which the feeder comprises two screw conveyors.

The embodiment of an apparatus 701A according to the disclosure shown in FIG. 8B is a variation of the embodiment shown in FIG. 8A and differs therefrom in that the feeder 703A comprises an array of two screw conveyors 738A, 757A. The screw conveyors 738A, 757A, as shown are housed in a common casing 739A. The screw conveyors could however have separate housings, and any number of screw conveyors can be united in an array.

Figure 9:
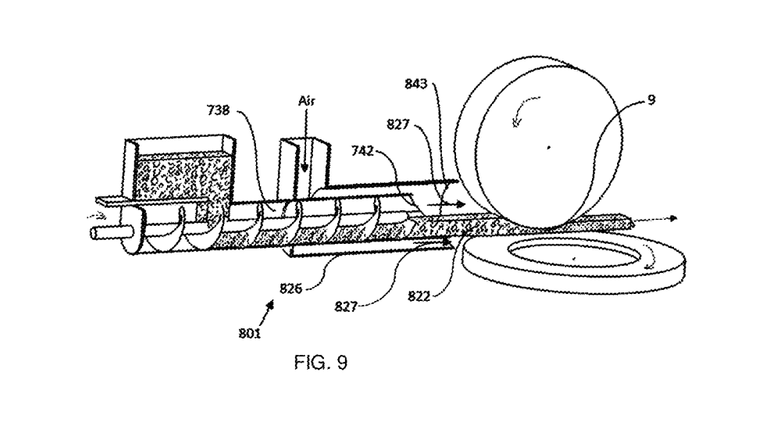
FIG. 9 is a diagrammatical representation and partly sectional view of a seventh embodiment of an apparatus according to the disclosure in which the feeder is a screw conveyor and particulate material is transferred to the vertical roller mill in contact with an air flow supplied through an air guide.

The seventh embodiment of an apparatus 801 according to the disclosure shown in FIG. 9 is a variation of the one shown in FIG. 8A and differs therefrom in that the flow 822 of particulate material is in contact with an air stream 827 supplied through an air guide 826 arranged at the outlet 742 of the screw conveyor 738. The air flow 827 exits the guide 826 at the outlet 843 and flows parallel to and in contact with the flow 822 of material being transferred to the grinding zone 9 of the vertical roller mill.

Figure 10A:
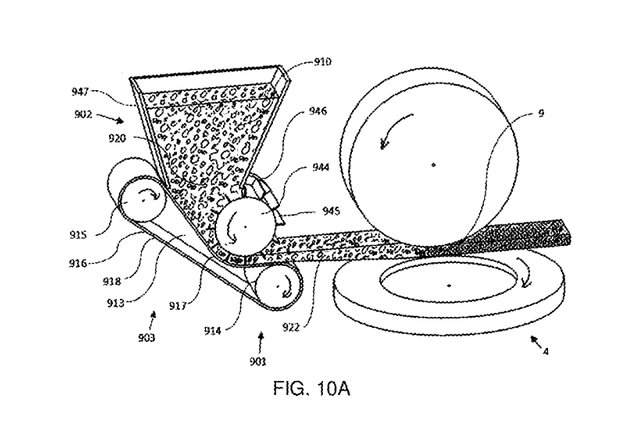
FIG. 10A is a diagrammatical representation and partly sectional view of an eighth embodiment of an apparatus according to the disclosure in which the feeder comprises by a first embodiment of a belt conveyor in combination with a deflection drum.
Figure 10B:
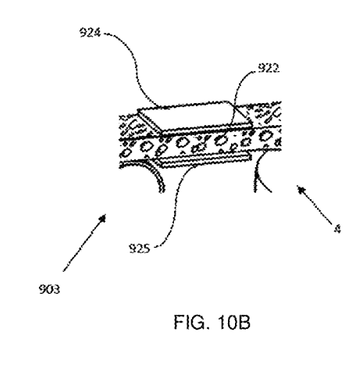
FIG. 10B is a diagrammatical representation and partly sectional view of the transfer of material between the feeder and the vertical roller mill supported by proximal guide plates.

The eights embodiment of an apparatus 901 according to the disclosure shown in FIG. 10A comprises a feeder 903 comprising belt conveyor 913, having two mutually spaced conveyor pulleys 914, 915 and an endless belt 916 extending between and around the pulleys 914, 915, and a deflection drum 944 deflecting the first run 917 of the belt towards the second run 918 of the belt to impart the first run 917 with a curved shape. The deflection drum 944 is provided with several blind holes 945 in the peripheral outer surface 946 thereof. An inlet device 902 comprises a funnel-shaped feeding chamber 947 having a lower outlet opening 920 through which particulate material 910 is supplied to the distal end of the belt conveyor 913 and to the deflection drum 944. The particular material 910 is trapped in the blind holes 945 and between the outer surface of the deflection drum 946 and the first run 917 of the belt 916 and by means of the rotational speed of the belt and the deflection drum projected as a flow 922 or mat of material through the air to the grinding zone 9 of the vertical roller mill 4. Additionally, and as indicated in FIG. 10B the embodiment of the disclosure shown can comprise an upper proximal guide plate 924 and a lower proximal guide plate 925 arranged between the proximal end of the feeder 903 and the vertical roller mill 4. The guide plates 924, 925 can converge from the proximal end of the feeder towards the vertical roller mill 4.

Figure 10C:
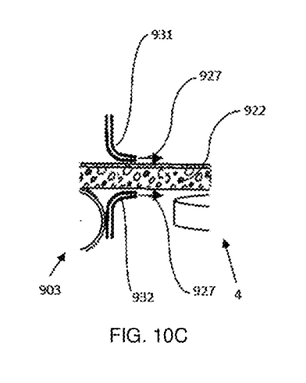
FIG. 10C is a diagrammatical representation and partly sectional view of the transfer of material between the feeder and the vertical roller mill in contact with an air flow supplied by nozzles.
Figure 10D:
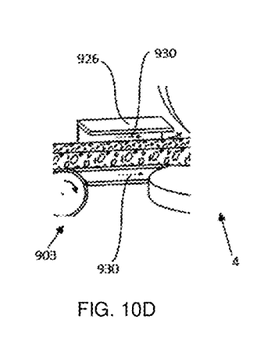
FIG. 10D is a diagrammatical representation and partly sectional view of the transfer of material between the feeder and the vertical roller mill in contact with an air flow flowing in an air guide.

Additionally, the embodiment of the disclosure shown can comprise an arrangement such that air is flowing parallel to and in contact with the flow 922 of material moving towards the vertical roller mill 4. The air flow 927, 930 can be delivered from nozzles 931, 932 as indicated in FIG. 10C or via a guide 926 as indicated in FIG. 10D.

Figure 11A:
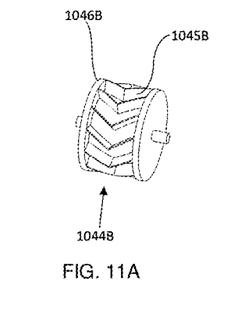
FIG. 11A is a diagrammatical representation of an implementation of the deflection drum with blind holes with a shape other than rectangular in the peripheral surface.
Figure 11B:
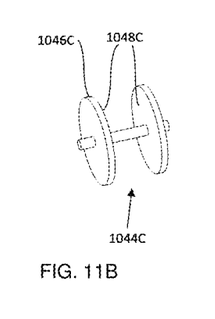
FIG. 11B is a diagrammatical representation of an implementation of the deflection drum comprising two wheels.
Figure 11C:
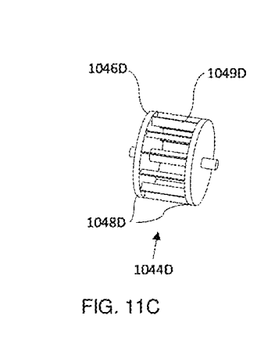
FIG. 11C is a diagrammatical representation of an implementation of the deflection drum comprising bars between the two wheels for engaging the material.
Figure 11D:
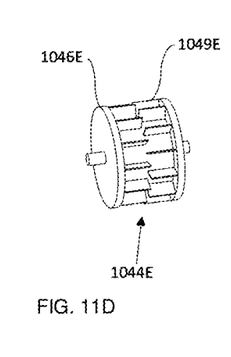
FIG. 11D is a diagrammatical representation of an implementation of the deflection drum comprising protrusions for engaging the material.

Additional embodiments of the deflection drum according to the disclosure are shown in FIGS. 11A-11D. FIG. 11A depicts a deflection drum 1044B with a peripheral surface 1046B in which the holes 1045B are not rectangular. FIG. 11B shows a deflection drum 1044C implemented as two spaced wheels 1048C having peripheral surfaces 1046C for engaging the belt. FIG. 11C shows an embodiment of the deflection drum 1044D in which bars 1049D are provided at the peripheral surface 1046D between the two wheels 1048D to engage with the material. In a further embodiment according to the disclosure of the deflection drum 1044E shown in FIG. 11D the deflection drum 1044E is provided with a plurality of staggered projections 1049E. The projections can be arranged to be substantially radial but do not have to be.

Figure 12:
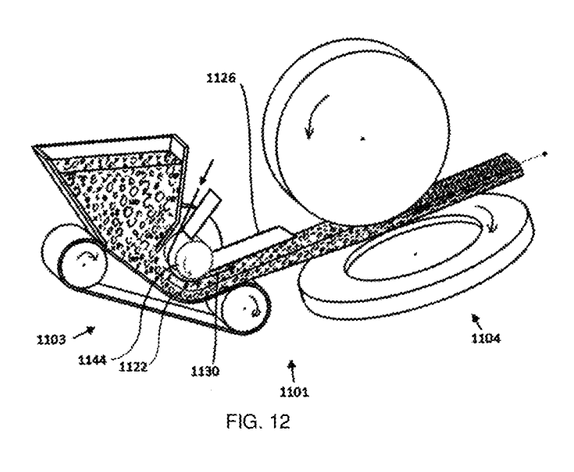
FIG. 12 is a diagrammatical representation and partly sectional view of a tenth embodiment of an apparatus according to the disclosure in which the feeder comprises by a third embodiment of a belt conveyor in combination with a deflection drum in which the deflection drum is arranged as two mutually spaced wheels, and an airflow is in contact with the material through the feeder and during the transfer of the material to the vertical roller mill.

The embodiment of the apparatus 1101 according to the disclosure shown in FIG. 12 comprises a feeder 1103 comprising a belt conveyor, having two mutually spaced conveyor pulleys, a belt extending between and around the pulleys and a deflection drum 1144 provided with two mutually spaced wheels deflecting between the conveyor pulleys the first run of the belt towards the second run of the belt to impart the first run with a curved shape. The flow 1122 of material flowing through the belt thrower is in contact with an air flow 1130 which enters the between the inlet device 1102 and the deflection drum and follows the flow 1122 around the curve imparted by the deflection drum and continues towards the vertical roller mill 1104. The air flow may optionally be guided by an additional air guide 1126.

In all of the other described embodiments of the apparatus according to the present disclosure the vertical roller mill can according to the disclosure be arranged as shown in FIG. 13A and FIG. 13B. The vertical roller mill 1204 is provided with an inner grinding zone support device 1250 extending along the grinding table rotational axis 1207 away from the grinding table 1205, and beyond the grinding table grinding surface 1251, being substantially concentric with the grinding table rotational axis 1207 such that the circumferential surface 1253 of the inner grinding zone support device 1250 provides side support for the material flow 1222 in the grinding zone 1209.

Further an outer grinding zone support device 1254 is provided radially extending beyond the grinding roller grinding surface 1252, being substantially concentric with the grinding roller rotational axis 1208 and located along the grinding roller rotational axis 1208 at a distance from the grinding table rotational axis 1207 such as not to interfere with the circumference 1255 of the grinding table 1205. The outer grinding zone support device 1254 is arranged such that the surface 1256 of outer grinding zone support device 1254 facing the grinding table 1205 provides side support for the material flow 1222 in grinding zone 1209 and thus reduces the side spillage of material.

Figure 14:
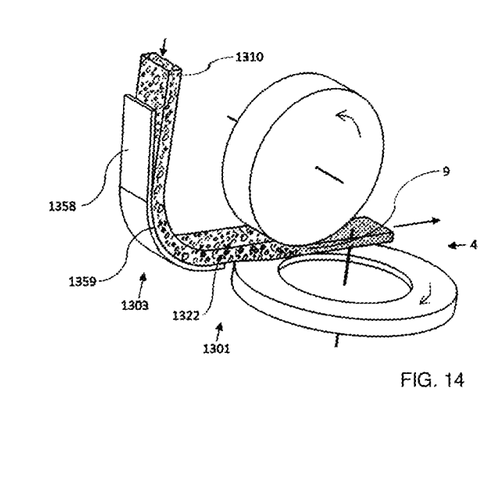
FIG. 14 is a diagrammatical representation of an eleventh embodiment of an apparatus according to the disclosure in which the feeder comprises a stationary device with a concave surface.

The embodiment of the apparatus 1301 according to the disclosure shown in FIG. 14 differs from the previous embodiments in that the feeder 1303 is a plate 1358 with a concave surface 1359. The particulate material 1310 is supplied to and continues along the concave surface 1359 thereby forming a flow 1322 which leaves the surface 1359 in a direction such that it is transferred to the grinding zone 9 of the roller mill 4. The plate could alternatively be a pipe, chute or any other device with a concave surface. This embodiment can optionally comprise any of the additions shown in FIGS. 10B, 10C and 10D, an upper proximal guide plate 924, a lower proximal guide plate 925, air flows 927, 930 via either nozzles 931, 932 or an air guide 926 arranged between the proximal end of the feeder 1303 and the vertical roller mill 4.

Figure 15:
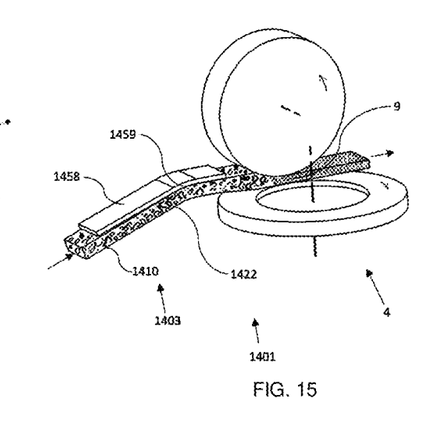
FIG. 15 is a diagrammatical representation of a twelfth embodiment of an apparatus according to the disclosure in which the feeder comprises a stationary device with a concave surface on the underside.

The embodiment of the apparatus 1401 according to the disclosure shown in FIG. 15 is similar to the previous embodiment in that the feeder 1403 is a plate 1458 with a concave surface 1459. The particulate material 1410 flows onto the underside and continues along the concave surface 1459 thereby forming a flow 1422 which leaves the surface 1459 in a direction such that it is transferred to the grinding zone 9 of the roller mill 4. The plate could alternatively be a pipe, chute or any other device with a concave surface.

Figure 16:
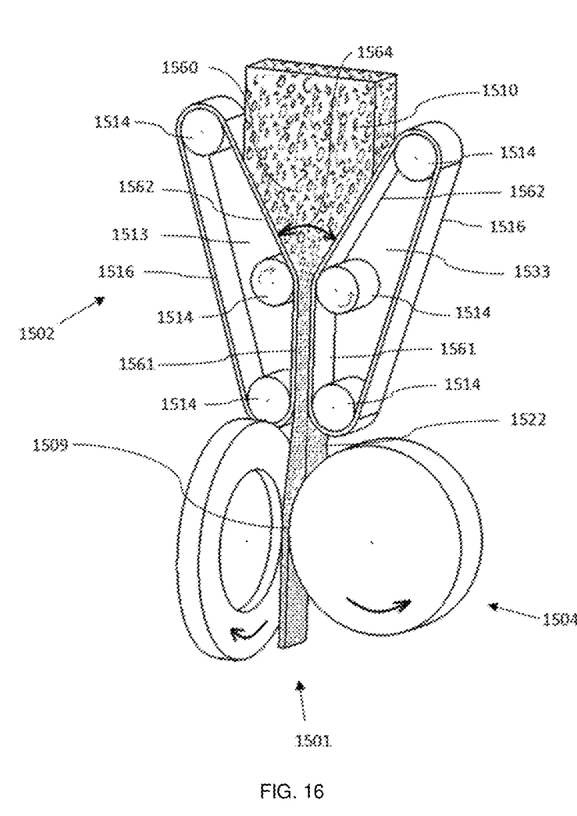
FIG. 16 is a diagrammatical representation on a thirteenth embodiment of an apparatus according to the disclosure in which the vertical roller mill is arranged to receive a flow of material vertically down from the feeder directly to the grinding zone.

In the embodiment of the apparatus 1501 according to the disclosure shown in FIG. 16, the vertical roller mill 1504 is arranged to receive a flow of material 1522 vertically down from the feeder 1502 directly to the grinding zone 1509. The feeder 1502 comprises two belt conveyors 1513, 1533 each comprising 3 pulleys 1514 and one belt 1516. A section of belt 1562 is arranged at an angle 1564 to the opposite section of belt 1562 such that the belts form a funnel 1560 for the granular material 1510. As the material 1510 flows down the funnel, it is wedged between the two angled belt sections 1562 and accelerated to the speed of the belts 1516. In the following section of belts 1561 the belts are arranged parallelly to constrain and form a mat of the material 1522 between the belts 1561. The mat of material 1522 is then directed to the grinding zone 1509 of the vertical roller mill 1504.

Figure 17:
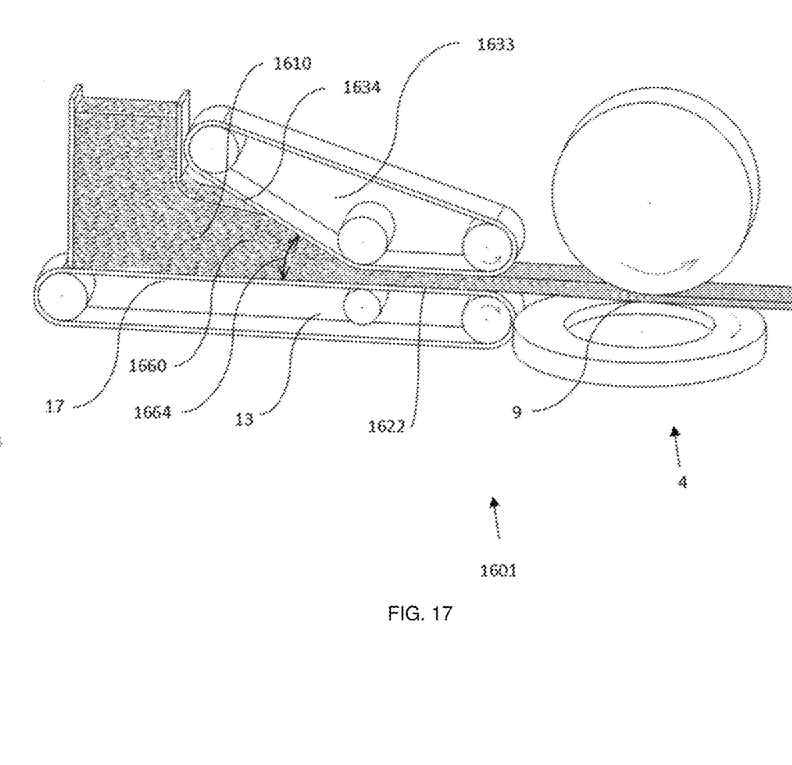
FIG. 17 is a diagrammatical representation on a fourteenth embodiment of an apparatus according to the disclosure in which a first belt conveyor and a second belt conveyor form a funnel.

The embodiment of the apparatus 1601 according to the disclosure shown in FIG. 17 is an alternative modification of the embodiment shown in FIG. 7. At the distal end a first run 1634 of a second belt conveyor 1633 is arranged at an angle 1664 to the first run 17 of the first belt conveyor 13 so they form a funnel 1660. The granular material 1610 is conveyed along the first run 17 of the first belt 13 until it is wedged between the two runs of belt 17, 1634 and is accelerated to the speed of the belts 13, 1633 before being directed to the grinding zone 9 of the vertical roller mill 4.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

Furthermore, it is to be understood that the disclosure encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim.

The disclosure should not be seen in any way restricted to the embodiments described and a person with ordinary skill in the art will foresee many possibilities to modifications thereof.

The above described embodiments are combinable. The following claims further set out particular embodiments of the disclosure.

The invention claimed is:

1. An apparatus for grinding a particulate material comprising:
a vertical roller mill arranged to grind the particulate material, the vertical roller mill arranged to grind the particulate material, the vertical roller mill including a grinding table and a grinding roller, the grinding roller having a rotational axis, each of the table and the grinding roller having a grinding surface; wherein a grinding zone is defined between the grinding surface of the grinding roller and the grinding surface of the grinding table; and
a feeder arranged to feed the particulate material to the vertical roller mill;
wherein the grinding roller is arranged to roll on the particulate material on a grinding path on the grinding table; and
the feeder is arranged to receive the particulate material and to direct a flow of the particulate material to the grinding zone of the vertical roller mill, wherein the flow of the particulate material is directed at a velocity in relation to the grinding roller rotational axis of at least 0.3 times a tangential velocity of the grinding surface of the grinding roller or at least one of 0.6, 0.7, 0.8, 0.9, 1.0, 1.1, 1.2, 1.3, 1.4, 1.5, 1.6, 1.7, 2.0, 3.0 or 4.0 times the tangential velocity of the grinding surface of the grinding roller.

2. The apparatus according to claim 1, wherein the feeder is arranged to direct the flow of the particulate material into the grinding zone at substantially the same velocity in relation to the grinding roller rotational axis as the tangential velocity of the grinding surface of the grinding roller at the grinding zone.

3. The apparatus according to claim 1, wherein the feeder is arranged to substantially constrain the flow of the particulate material being directed to the grinding zone to a predetermined defined cross-section.

4. The apparatus according to claim 1, wherein the feeder is arranged to direct the flow of the particulate material by applying a momentum to, or pushing, or applying a momentum to and pushing, the particulate material into the grinding zone.

5. The apparatus according to claim 1, wherein the feeder is arranged to compact the flow of the particulate material prior to directing the particulate material into the grinding zone.

6. The apparatus according to claim 1, wherein the feeder is arranged to direct the flow of the particulate material to the grinding zone at an angle substantially tangentially to the grinding path.

7. The apparatus according to claim 1, wherein the feeder further comprises a guiding tray that is adjacent and substantially parallel to the material flow of the particulate material, or adjacent and tangential to the flow of the particulate material.

8. The apparatus according to claim 1, wherein the feeder is arranged to direct the flow of material into the grinding zone at an angle relative to a plane defined by the grinding surface of the grinding table, wherein the angle is more than zero and less or equal than 30°.

9. The apparatus according to claim 1, wherein the feeder further comprises at least one belt conveyor comprising at least two pulleys and one belt extending around the pulleys.

10. The apparatus according to claim 9, wherein the feeder comprises two runs of belt arranged opposite each other in respect of the particulate material to constrain the particulate material between the two runs of belt.

11. The apparatus according to claim 10, wherein the two runs of belt form a funnel with an opening for receiving the particulate material, the funnel having an opening angle of at least one of 0.5, 1, 5, 10, 15, 20, 25, 30, 40, 50, 60 or 70 degrees between the two runs of belt forming the funnel.

12. The apparatus according to claim 9, wherein the feeder comprises at least one deflection drum deflecting a first run of belt towards a second run of belt between two pulleys to impart the first run a curved shape.

13. The apparatus according to claim 12, wherein the at least one deflection drum comprises at least one of: a plurality of holes in a peripheral surface of the deflection drum;
    a plurality of spaced wheels engaging the first run of belt; and
    a plurality of projections.

14. The apparatus according to according to claim 1, wherein the feeder comprises one of:
    at least one screw conveyor comprising a rotating helical screw blade;
    at least one stationary feeder; and
    an array of sub-feeders that is united and arranged to form the flow of the particulate material and to direct the flow of particulate material to the grinding zone.

15. A method for grinding a particulate material comprising:
    receiving a supply of the particulate material;
    forming a flow of the particulate material;
    using a feeder to direct the flow of the particulate material to a grinding zone of a vertical roller mill, the vertical roller mill including a grinding table and a grinding roller, the grinding roller having a rotational axis, each of the grinding table and the grinding roller having a grinding surface; wherein a grinding zone is defined between the grinding surface of the grinding roller and the grinding surface of the grinding table, the grinding roller being arranged to roll on the particulate material on a grinding path on the grinding table, wherein the flow of the particulate material is directed at a velocity in relation to the grinding roller axis of at least 0.3 times a tangential velocity of the grinding surface of the grinding roller or at least 0.6, 0.7, 0.8, 0.9, 1.0, 1.1, 1.2, 1.3, 1.4, 1.5, 1.6, 1.7, 2.0, 3.0 or 4.0 times the tangential velocity of the grinding surface of the grinding roller-grinding surface; and
    grinding the particulate material in the vertical roller mill.

16. The method according to claim 15, comprising the feeder directing the flow of the particulate material into the grinding zone at substantially the same velocity in relation to the grinding roller rotational axis as the tangential velocity of the grinding surface of the grinding roller at the grinding zone.

17. The method according to claim 15, further comprising directing the particulate material to the grinding zone of the vertical roller mill in a substantially straight direction without substantial directional change between the feeder and the grinding zone other than that caused by gravity.

18. The method according to claim 15, further comprising compacting the flow of the particulate material by imposing a directional change by application of a centrifugal force.

19. The method according to claim 15, further comprising directing the particulate material to the grinding zone at a velocity in relation to the grinding roller rotational axis of at least 0.6 times the tangential velocity of the grinding surface of the grinding roller or at least one of 0.7, 0.8, 0.9, 1.0, 1.1, 1.2, 1.3, 1.4, 1.5, 1.6, 1.7 or 2.0 times the tangential velocity of the grinding surface.

20. The method according to claim 15, further comprising supporting the particulate material in the grinding zone at least on one side of the grinding zone for reducing the escape of particulate material from a volume between the grinding surface of the grinding roller and the grinding surface of the grinding table.

* * * * *

UNITED STATES PATENT AND TRADEMARK OFFICE
CERTIFICATE OF CORRECTION

| | |
|---|---|
| PATENT NO. | : 12,357,998 B2 |
| APPLICATION NO. | : 17/997068 |
| DATED | : July 15, 2025 |
| INVENTOR(S) | : Anders Fougner and Mads Jespersen |

It is certified that error appears in the above-identified patent and that said Letters Patent is hereby corrected as shown below:

In the Claims

In Claim 7, Column 20, Line 60, the text "parallel to the material flow" should read --parallel to the flow--

In Claim 15, Column 22, Lines 10 and 11, the text "grinding surface of the grinding roller-grinding surface; and" should read --grinding surface of the grinding roller; and--

In Claim 19, Column 22, Line 33, the text "of the grinding surface." should read --of the grinding roller grinding surface.--

In Claim 20, Column 22, Line 36, the text "reducing the escape" should read --reducing escape--

Signed and Sealed this
Fourteenth Day of October, 2025

John A. Squires
*Director of the United States Patent and Trademark Office*